United States Patent Office 3,198,844
Patented Aug. 3, 1965

3,198,844
CYCLIC PRODUCTS OF PARA-XYLYLENE
Louis A. Errede, Roseville, Minn., assignor to Minnesota
Mining and Manufacturing Company, St. Paul, Minn.,
a corporation of Delaware
No Drawing. Filed July 12, 1961, Ser. No. 123,416
8 Claims. (Cl. 260—668)

This invention relates to new and very useful processes for making cyclic derivatives of para-xylylene and also to a new class of products produced therefrom, cyclic tetramers of para-xylylenes.

Heretofore, the art has known only how to produce in quantity relatively high molecular weight polymers of the para-xylylenes. Cyclic dimers and trimers of para-xylylenes were known but could be produced only in very small amounts. Cyclic tetramers of para-xylylenes were unknown. By the processes of this invention, it is now possible to selectively control polymerization of para-xylylenes so as to produce dimers, trimers and even the heretofore unknown tetramers of para-xylylenes in large yields.

In accordance with the teachings of this invention, such low molecular weight cyclic derivatives of para-xylylenes are made from para-xylylenes by the technique of rapidly warming cold clear solutions of para-xylylenes to critical, predetermined reaction temperatures. Such rapid warming is accomplished by either slow addition of a cold solution to a well stirred heated constant-temperature liquid medium or by rapid warming of a cold solution.

To practice this invention, one first prepares or obtains a para-xylylene in solution. One well known method for preparing a para-xylylene solution is first to pyrolyze a para-xylene at low pressures and then condense the pyrolizate into a solvent kept below about $-45°$ C. See, for details of this method, L. A. Errede and B. F. Landrum in U.S. Patent No. 2,777,005 and J.A.C.S., Vol. 79, page 4952 (1957), or L. A. Errede, R. S. Gregorian, and John M. Hoyt in J.A.C.S., Vol. 82, page 5218 (1960).

By the term "para-xylylenes," reference is had to those pseudo-diradical materials, heretofore referred to as quinodimethanes, structurally believed to exist in the dimethylene quinoid state, in the diradical state, or in a mixture of both states, depending upon the energy level. These molecules can best be described in terms of mathematical calculations such as those made by Coulson and others (see C. A. Coulson, D. P. Craig, A. Maccoll and A. Pullman, Disc. Faraday Soc., 2, 36 (1947); A. Namiott, M. Diatkina, and J. Syrkrin, Compt. Rend. Acad. Scie. U.S.S.R., 1945, 48, 285; M. Diatkina and J. Syrkin, Acta Physiochim, U.S.S.R., 1946, 21, 23).

Chemically, examples of para-xylylenes in the generic sense include those structures represented by the formula:

Formula 1

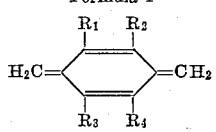

where $R_1$, $R_2$, $R_3$ and $R_4$ can be the same or different and are selected from the group consisting of hydrogen, methyl, phenyl, chlorine and fluorine. Other examples of para-xylylenes include structures such as follows:

Formula 2

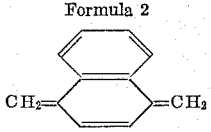

Formula 3

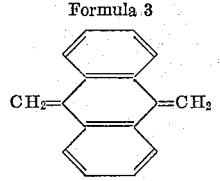

Formula 4

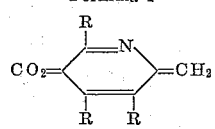

Formula 5

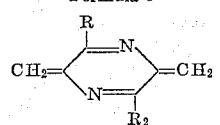

Formula 6

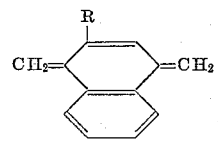

Formula 7

Formula 8

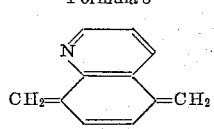

Formula 9

Formula 10

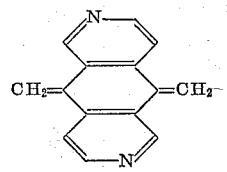

In Formulas 2 through 10 above, R can be hydrogen, methyl, phenyl, chlorine or fluorine as defined for Formula 1.

Compounds of Formulas 1 through 10 above are all known and can be made by known synthetic procedures.

In general, any inert, molecular oxygen-free, organic solvent can be used to prepare a solution of a para-xylylene so long as such solvent is liquid at the particular low temperatures employed. By "inert" is meant that the solvent does not react or combine with more than about 5 weight percent of either the para-xylylene starting materials or the cyclic products in any given system. A molecular oxygen-free solvent is readily obtained by simply distilling the solvent before it is used in the processes of this invention; such a procedure is effective in removing any dissolved $O_2$ which may be present. In general, the chemical composition of these organic solvents is not critical. While hydrocarbon liquids as solvents are preferred, they are by no means critical.

If other compounds containing oxygen are present, such as ethers, aldehydes and alcohols, no adverse effect upon the processes or products of the invention is observed, but one should attempt to keep reactants and reaction media free from molecular oxygen. Molecular oxygen reacts rapidly with the para-xylylene to give polyxylylene peroxides.

Among the specific solvents which may be used for dissolving para-xylylenes are the paraffinic and cycloparaffinic hydrocarbons of low freezing point, such as hexane, petroleum ether, cyclopentane, and 1,4-dimethylcyclohexane; the aromatic hydrocarbons of low freezing point, such as toluene, ethylbenzene, o-ethyltoluene and m-dimethylbenzene; the halogenated hydrocarbons of low freezing point, such as o-chloroethylbenzene, o-fluorotoluene and 1,1-dichloroethane; carbonyl compounds with low freezing point, such as ethyl acetate, methyl isobutyrate, isobutyl formate, acetone, methyl ethyl ketone and methyl-isobutyl ketone; ethers of low freezing point, such as diethyl ether, ethyl-n-propyl ether and tetrafluorofurane; alcohols of low freezing point, such as methanol, ethanol and isopropyl alcohol; and other normally liquid compounds of low freezing point, such as carbon disulfide. If desired, liquids of low freezing point may be obtained by blending of two or more compounds of higher freezing point, for example, mixtures of carbon tetrachloride and chloroform may be used.

Because prepared solutions of para-xylylenes must be maintained at temperatures at least as low as about −45° C., and preferabl yat temperatures below about −70° C., higher process temperatures are unacceptable because at such temperatures the characteristic auto-polymerization of para-xylylenes to high molecular weight products occurs too rapidly to be of value in this invention. Because the solvents must be so chilled, it is preferable to use solvent media which are liquids at temperatures at least down to about −70° C., and broadly, are liquids at least as low as about −45° C.

As prepared, solutions of para-xylylenes are usually slightly cloudy and range in color from colorless to slightly amber. The amber color usually appears when severe pyrolytic synthesis conditions have been employed, since colored products such as methylanthracene can form during pyrolysis. The cloudy condition of the solutions is due to the presence of crystalline para-xylene and some polymerized para-xylylenes.

Because, for purposes of the processes of this invention, the poly-p-xylylene produced during the preparation of the p-xylylene solution serves as unwanted polymerization sites during subsequent cyclic product formation, it is desirable to filter the cold liquid solution or otherwise treat the solution to remove any solids dispersed throughout the mixture.

Filtration can be accomplished by any conventional means but should be carried out in the absence of oxygen at a temperature preferably below −70° C. (broadly, below about −45° C.). A temperature of −78° C. is easy to obtain using a mixture of acetone and solidified carbon dioxide. Preferably, the oxygen-free apparatus in which filtration is accomplished is prechilled to −78° C. One preferred filtering medium here is crystalline para-xylene supported by a filter paper, although any relatively coarse filter paper alone can also be used. Crystalline para-xylene is convenient because it permits rapid filtration.

The cold, clear (filtered) solution of para-xylylene is now ready to be subjected to rapid warming to critical preselected reactive temperatures in order to produce the desired low molecular weight cyclic products of para-xylylenes. In general, any conventional means for rapid warming can be employed; however, the following procedures have been found to be the best working embodiments of the processes of this invention.

In one procedure, the cold, clear para-xylylene solution is slowly passed into a well-stirred constant temperature liquid medium. The rate of addition of the cold, clear solution is preferably slow enough to ensure that substantially instantaneous warming of the cold solution in the heated constant temperature liquid medium occurs. In general, the more rapid the heating the higher the yield of low molecular weight cyclic products. By "substantially instantaneous warming" is meant that the warming preferably occurs within a time interval not greater than that of the order of hundredths of a second.

The nature of the liquid used in the consatnt temperature medium is not critical, although it is generally preferred to use inert organic solvents that are liquids at the particular temperatures involved. Most preferably this solvent is a hydrocarbon. In general, the characteristics of this liquid are the same as those enumerated above for the solvent of the starting para-xylylene material, although, in addition, the liquid should be compatible or non-reactive with the particular solvent used for the para-xylylene.

To prepare cyclic dimers of a para-xylylene, it is preferred to add slowly (so as to cause substantially instantaneous warming) the cold (below about −70° C.), clear (i.e., filtered), oxygen-free (i.e., $O_2$ free), inert solution of the para-xylylene into an inert, oxygen-free liquid medium maintained at a temperature between about +70° C. and +95° C. To prepare cyclic trimers and cyclic tetramers of a para-xylylene, it is preferred to slowly add such a solution of the para-xylylene into an inert, oxygen-free liquid medium whose temperature is maintained in the range of from about −10° C. to +25° C. In general, it is preferred that there be present a vast excess of liquid in the heated medium to which the solution is added, that is, an excess beyond that necessary to produce a saturated solution of the cyclic products. Thus, it is preferred that there be at least a 1,000-fold excess, and, broadly, at least a 500-fold excess. Reaction occurs as fast as the addition of the solution takes place. This serves to maintain conditions that approach infinite dilution.

A preferred operating procedure for producing cyclic dimers of a para-xylylene is to add (i.e., mix) a clear, oxygen-free, inert liquid solution of a para-xylylene maintained at a temperature not above about −70° C. to an inert, oxygen-free hydrocarbon solvent maintained at a temperature not below about +70° C., said addition being conducted at such a rate that the para-xylylene solution is substantially instantaneously warmed to about +70° C. upon contact with the hydrocarbon. The resulting mixture is then subjected to conventional distillation or evaporation procedures so as to leave a liquid residue containing the desired cyclic dimer in at least a 0.5 molar concentration.

One convenient modification of the preferred embodiment of this invention well suited for the production of cyclic trimers and tetramers of para-xylylenes is to begin with a clear, cold, oxygen-free solution of the para-xylylene in which the molar concentration of para-xylylene is in the range of from about 0.1 to 0.005. This dilute solution is then warmed from about −70° C. to a temperature at a rate of at least about 2° C. per minute. The resulting warmed solution contains a mixture of cyclic trimers and tetramers which can be separated out in solid form by drying the resulting solution and then purifying the dry product.

The starting solution of para-xylylene, with the exception of the modifications just noted, generally need contain no special concentration of para-xylylene. No upper limit on the amount of material which can be dissolved within the cold solvent is known, though, as a practical matter, saturation of the solvent medium provides a practical upper limit. The lower limit is determined strictly by reasons of convenience since, naturally, an excessively dilute solution should be avoided simply as a matter of process economics.

A convenient method of isolating the cyclic dimer products produced in accordance with this invention is to evaporate the resulting liquid mixture to dryness under a stream of nitrogen and then extract the resulting residue first with a solvent such as acetone to remove acetone-soluble impurities and then with a solvent such as one selected from the group consisting of boiling toluene or boiling xylene. The resulting toluene or xylene solution is cooled and evaporated to produce a purified solid cyclic dimer product. To isolate the trimer products, the liquid product is first evaporated to dryness, then extracted with hexane. Then the hexane solution is separated by chromatography, as described in Example 1 below. Cyclic tetramers are obtained along with cyclic trimer and are separated therefrom by fractional crystallization as also described in Example 1 below.

In general, cyclo-tri-p-xylylene is obtained as an impure residue. This residue can be purified by conventional liquid phase chromatography or vacuum distillation, as is described in the examples.

From an analysis of the reaction kinetics involved in the processes of this invention, one would expect that the conditions employed would favor cyclic dimer formation by inducing ring closure at the dimer stage. However, apparently because of the strained configuration of the dimer molecule, ring closure of the para-xylylene diradical at the dimer stage simply does not occur under trimer formation conditions. Unexpectedly and unpredictably, by using extreme temperature change from minus 70° to plus 70° concomitant with rapid great (even infinite) dilution, one obtains the surprising high yields of the cyclic dimer (i.e., of the order of 90 percent based on available monomer) that is associated with the processes of this invention.

In general, the cyclic products of this invention are useful as ultra-violet light absorbers. Thus, for example, the dimers, trimers and tetramers can each be separately dispersed or dissolved in a relatively volatile fluent carrier. The liquid mixtures are then sprayed upon the surface of an object, such as a fabric, and the resulting coated surface allowed to dry. The so-treated surface is a good absorber of ultra-violet light.

The compounds of this invention are also useful as intermediates for the synthesis of dyestuffs by well known organic reactions. See, for example, the article by D. J. Cram in "Record of Chemical Progress," vol. 20, beginning at page 71, wherein a number of useful products and their intermediates are prepared systematically from the cyclic dimers and trimers of para-xylylene. Among the products Cram prepares are olefins and diolefins of the cyclic dimer which are useful as polymerizable olefinic monomers and as crosslinking agents. These cyclic monoolefin derivatives are also opened to form useful difunctional compounds, such as diamines and dicarboxylic acids.

As noted, the processes of this invention produce a heretofore unknown class of materials, to wit, cyclic tetramers of para-xylylene. The simplest member of this family of compounds, cyclic para-xylylene tetramer, have the structural formula:

Formula 11

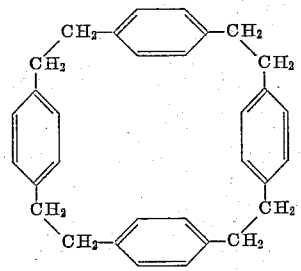

This Formula 11 can be written as

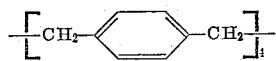

The invention is further illustrated by reference to the following specific examples. Those skilled in the art will appreciate that a number of modifications are within the spirit and scope of this invention and that the specific examples below are given by way of example only and not by way of specific limitation. In this application, "parts" are parts by weight and temperature is expressed in degrees centigrade.

Example 1 describes the preparation of cyclo-di-, cyclo-tri- and cyclo-tetra-p-xylylenes by a method which provides relatively small yields, and details a convenient method for isolating these products.

*Example 1* p-Xylene is pyrolyzed at 1065±5°, 4.0±0.1 mm. Hg pressure and 0.0041±0.0003 sec. residence time and the pyrolyzate is condensed in 4 liters of hexane kept at −78° C. The details of this procedure are described in a previous publication (L. A. Errede and B. F. Landrum, JACS, 79, 4952, 1957). A p-xylene concentration of 0.08 to 0.12 mole/liter is accumulated after 3 hours of pyrolysis. The solution is warmed to room temperature thereby forcing rapid polymerization of all the accumulated p-xylylene. A copious precipitate of poly-p-xylylene forms throughout the liquid and this is removed by filtration.

Mass spectrometric analysis of the hexane mother liquor indicates that toluene, benzene, styrene and p-ethyltoluene are produced during the pyrolysis and are condensed along with p-xylene. The compounds are identified primarily by their respective molecular mass peaks and secondarily by their corresponding characteristic fragmentation patterns (the fragmentation patterns of sample compounds, including the molecules considered here, are given in the American Petroleum Institute Mass Spectra Data Sheet). In this respect some data indicates that cyclooctatetraene might also be present in the pyrolyzate in small amount, but this is not confirmed by other methods of identification. An appreciable amount of styrene is accumulated in the liquid nitrogen trap of the pyrolysis system. Its presence in the condensate mixture is indicated clearly by its infrared absorption spectrum, showing peaks at 10.1, 11.05, 12.9 and 14.4μ, and by its characteristic odor. No attempt is made to isolate these volatile compounds in pure form nor to prepare solid derivatives thereof since these compounds are reported previously by others. (J. R. Schaefgen, J. Polymer Sci., 15, 203 (1955); M. Szwarc, Nature, 160, 403 (1947).)

The soluble non-volatile products of pyrolysis (1,2-di-p-tolylethane, di-arylmethanes and anthracenes) and the soluble products of p-xylylene polymerization (cyclo-di-tri- and tetra-p-xylylene and low molecular weight poly-p-xylene) are recovered by evaporation of the hexane mother liquor. The combined weight of insoluble polymer and soluble residue is considered simply as "xylyl equivalent" without attempting to differentiate the components of the mixture at this stage of the analysis.

A series of 10 experiments using the pyrolysis conditions given above indicates that the analytical procedure accounted for 99±3% of the phenyl units metered to the system as p-xylene and that the composition of the condensate is 76±2% p-xylene, 14±1% "xylyl equivalents," 7.1% toluene, 2±0.6% styrene and 1±0.5% p-ethyl toluene.

In order to determine the actual composition of the non-volatile products tentatively considered as "xylyl equivalents," additional runs are carried out at the specified conditions of pyrolysis until a total of 2.5 kg. of insoluble polymer and 2.3 kg. of soluble non-volatile products are accumulated as described above. The infrared spectrum (strong peak at 12.20μ, medium at 8.30, 8.78, 9.26 and 9.81μ, plus the usual aromatic peaks at 3 to 7.5μ) and X-ray diffraction pattern (sharp rings at 4.0 and 5.3 A.) of the insoluble polymer indicate that this material is the α-form of poly-p-xylylene as characterized by Brown and Farthing (C. J. Brown and A. C. Farthing, J. Chem. Soc., 3276, 1953).

The semi-solid mixture of soluble non-volatile products (2292 g.) is washed with a vigorous stream of hexane leaving a residue of insoluble heavy crystals of cyclo-di-xylylene (20 g.). The compound is purified by recrystallization from toluene in the form of cubic crystals (M.P. 281–283°).

*Anal.*—Calcd. for $C_{16}H_{16}$: C, 92.29; H, 7.74; mol. wt., 208. Found: C, 92.4; H, 7.58; mol. wt., 206.

The nuclear magnetic resonance spectrum is consistent with the assigned structure and the infrared spectrum is identical with that reported in the literature (D. J. Cram and H. Steinberg, J. Am. Chem. Soc., 73, 5691, 1951). The nuclear magnetic resonance τ-values reported here refer to the system of G. V. D. Tiers, J. Phys. Chem., 62, 1151 (1958); (the melting points reported here are all uncorrected) τ 3.61 for phenyl, 7.01 for methylene).

The hexane slurry of insoluble fluffy products from the above washing is separated by filtration. The average molecular weight of this dark brown insoluble material (701 g.) is 1020 to 1600 (cryoscopic method in benzene). The infrared spectrum is similar to that of insoluble poly (p-xylene). On the basis of these results it is concluded that this material is mostly low molecular weight poly (p-xylylene).

The filtrate is separated by chromatography to yield 575 g. of white crystals (M.P. 135–150°) and 692 g. of a non-volatile amber oil. This is accomplished by using four columns, 6 feet long and 2 inches in diameter, each filled with 4 lb. of active alumina. Each column is eluted with 22 liters of hexane. Successive 1-liter cuts are taken. The residual adsorbed material is eluted by progressively polar solvents in the order benzene, ether and methanol in the usual fashion, taking successive 1-liter cuts. The non-volatile solid residue from each cut is recrystallized from methanol and is obtained in two distinct crystalline forms. One is large and dense and the others are small and fluffy. The crystals are separated easily by swirling and decantation. The small fluffy needles (28 g.) are recrystallized from ethanol in the form of tiny pearl-white platelets (M.P. 140.5–142°). The infrared spectrum of this compound (strong peak at 12.24 for para substituents, weak peak at 7.25μ for methyl, plus the usual aromatic and aliphatic absorptions from 3.0 to 7.0μ) and its melting point are in agreement with those reported for 1,4 - bis - (2-p-tolylethyl) - benzene (W. Baker, J. P. W. McOmie and J. M. Norman, J. Chem. Soc., 1114, 1951). The assigned structure also is vertified by its proton magnetic resonance spectrum (τ-values: 3.01 for phenyl, 7.19 for methylene and 7.70 for methyl). The large heavy needles (515 g.) are recrystallized from acetone to yield large pinate crystals (M.P. 162–164°). A small sample is purified further by sublimation. The melting point (166–167°) and infrared spectrum of this compound are in agreement with those reported for cyclo-tri-p-xylylene (W. Baker, J. F. W. McOmie and J. M. Norman, J. Chem. Soc., 1114, 1951), (L. A. Auspos, C. W. Burman, L. A. R. Hall, J. K. Hubbard, W. Kirk, Jr., J. W. Schaefgen and S. P. Speck, J. Polymer Sci., 15, 19, 1955). Its nuclear magnetic resonance spectrum (τ-values: 3.40 for phenyl and 7.08 for methylene) is also consistent with the assigned structure.

*Anal.*—Calcd. for $C_{24}H_{24}$: C, 92.29; H, 7.74; mol. wt., 312. Found: C, 91.9; H, 8.07; mol. wt., 299.

The acetone mother liquor is concentrated to a small fraction of its original volume and crystallization was allowed to occur very slowly. A few large crystals form along with the needle-like crystals of cyclo-tri-p-xylylene. The former can be removed by means of a pair of tweezers and then purified by recrystallization from acetone. The compound (M.P. 179–182°) thus obtained is cyclo-tetra-p-xylylene, having molecular weight 421. Its infrared spectrum is very similar to that of poly-p-xylylene. Its proton magnetic resonance spectrum (τ-values: 3.37 for phenyl and 7.22 for methylene) is also in agreement with the assigned structure.

The 692 g. of amber oil obtained by chromatographic separation as described above is separated by vacuum distillation at 1 mm. pressure into three fractions: (1) 501 g., B.P. 112–140°; (2) 115 g., B.P. 160–200°; (3) 50 g. residue. Infrared analysis indicates that fraction 3 is mostly cyclo-tri-p-xylylene and that fraction 2 is a mixture of anthracenes from which anthracene (M.P. 214–215°, purple fluorescence under ultraviolet light), 2-methyl-anthracene (M.P. 206–207°, yellow green fluorescence under ultraviolet light) and 2,6-dimethylanthracene (M.P. 239–241°, pale blue fluorescence under ultraviolet light) are separated by repeated fractional crystallization and sublimation. A sample of each anthracene is oxidized by $K_2Cr_2O_7$ in hot acetic acid to anthraquinone (M.P. 289–291°), 2-methylanthraquinone (M.P. 176–177°) and 2,6-dimethylanthraquinone (M.P. 240–243°), respectively. Although the separation of the anthracene mixture is by no means quantitative, the major component appears to be 2-methylanthracene.

Fraction 1 is dissolved in a minimum amount of methanol, and the solution is cooled to −78°. Tiny platelets of 1,2-di-p-tolylethane (242 g., M.P. 74–76°) precipitates from solution; a 3-g. sample of the crystalline hydrocarbon is purified further by sublimation and subsequent final recrystallization from hexane to afford the compound in the form of pearl-white platelets (M.P. 80.5–81.5°). Its nuclear magnetic resonance spectrum (τ-values: 3.04 for phenyl, 7.19 for methylene, 7.78 for methyl) is consistent with the assigned configuration.

*Anal.*—Calcd. for $C_{16}H_{18}$: C, 91.37; H, 8.63; mol. wt. 210.3. Found: C, 91.4; H, 8.48; mol. wt. 206.

The solute of the methanol mother liquor is recovered by evaporation to constant weight (250 g.) at 100°. The oil is redistilled at 0.06 mm. pressure (B.P. 82–83°, $n^{23}_D$ 1.5670). The ultraviolet and infrared spectra of the center cut and its elemental analysis indicate that the oil is a mixture of dimethyl homologs of diphenylmethane.

*Anal.*—Calcd. for $C_{15}H_{16}$: C, 91.78; H, 8.22; mol. wt., 196.3. Found: C, 91.8; H, 8.36; mol. wt., 187.

Thus the composition of the 4.8 kg. of non-volatile product produced via fast flow pyrolysis of p-xylene at 1065°, 4 mm. pressure and 0.004 sec. residence time is 80% p-xylylene (isolated as its products of polymerization; 2.5 kg. of insoluble polymer, 700 g. of soluble polymer, 600 g. of cyclo-tri-p-xylylene and 20 g. of cyclo-di-p-xylylene), 5% sym-di-p-tolylethane, 2% anthracenes and 8% unaccounted for material. The results enable one to break down the observed 14% conversion of p-xylene to non-volatile products (weighed initially as "xylyl equivalents") into 12% p-xylylene, 0.7% sym-di-p-tolylethane, 0.7% diarylmethanes and 0.3% anthracenes.

The composition of the pyrolyzate produced via fast flow pyrolysis is a function of the pyrolysis conditions. Thus in another series of experiments in which 32 kg. of p-xylene is pyrolyzed at 900 to 930°, 0.01 to 0.04 sec. residence time and 10 to 30 mm. pressure, there is accumulated 1 kg. (3.1% yield) of non-volatile products. This mixture is separated essentially as described above. The composition is 49.5% p-xylylene (isolated as its product of polymerization), 31% sym-di-p-tolylethane, 13% diarylmethanes, 3% anthracenes (mostly 2,6-dimethylanthracene) and 2% 4,4-dimethylstilbene. Thus, these products are obtained in 1.5, 1.0, 0.4, and 0.1 and 0.05% conversion per pass, respectively.

The polymerization product contains the cyclic di-, tri- and tetra-p-xylylenes as well as polymers, as described above. The yield and selectivity of these cyclic products is significantly improved by the use of the process of the invention as described in the following examples.

Example 2

A 0.080 molar solution of p-xylylene in hexane is prepared as described previously. Crystaliine p-xylene and poly-p-xylylene are removed by filtration. One liter of the clear filtrate, still 0.080 molar with respect to p-xylylene, is diluted at −78° with 9 liters of oxygen-free hexane. The resulting 10-liter solution is warmed to room temperature in the absence of oxygen, over a period of about one hour. Only 0.5 g. of insoluble polymer is formed during the warming process. An additional 8 g. of soluble products of polymerization is recovered from the mixture remaining after the excess solvent is removed by distillation. The major component is identified by infrared analysis as cyclo-tri-p-xylylene; only a trace amount (0.1 g.) of cyclo-di-p-xylylene is isolated as described previously. A second one-liter aliquot of the undiluted original solution is polymerized by warming to room temperature as a control experiment to afford 4.6 g. of insoluble polymer and 4 g. of soluble low molecular weight products of polymerization and pyrolysis, the composition of which is similar to that of the comparable product of Example 1, only 0.1 g. of which is cyclo-di-p-xylylene.

Example 3

A solution of p-xylylene in hexane is prepared as described above and separated by filtration. One liter of cold (−78°) filtrate containing 13 g. of p-xylylene is added dropwise over a period of 1 hour to liter of toluene kept at 90°. A small amount of monomer (1.5 g.) polymerizes in the cold solution during the addition and this is removed by filtration. The hot toluene solution is evaporated to dryness. The residue (15 g.) is leached with hot acetone leaving 4.7 g. of insoluble cyclo-di-p-xylylene which after one recrystallization from toluene is obtained as white crystals (M.P. 283–285°). The major component of the acetone-soluble products of polymerization is identified as cyclo-tri-p-xylylene. A second one liter aliquot of the original solution is polymerized by warming to room temperature as a control experiment to afford 5 g. of insoluble polymer, 12 g. of soluble products, the composition of which is about the same as that described in Example 1.

Example 4

A cold (−78°) clear solution of p-xylylene (.20 mole) in hexane (4.5 l.) is prepared in the usual way. The mixture is separated from any extraneous particulate matter at −78° by rapid filtration through a bed of crystalline p-xylene on a filter funnel. The clear cold filtrate is added to acetic acid (1.5 l.) contained in a 3 l. round bottom flask fitted with a dropping funnel, stirrer and take-off condenser. The rate of addition is about equal to the rate of flash distillation at about 100° C. so that the volume in the flask is kept constant at about one liter. The addition requires about one hour. The hot reaction mixture (about 1.5 l.) remaining in the flask is separated by filtration and 0.9 g. of a polymer is isolated. The mother liquor is evaporated to dryness leaving 28 g. of semi-solid product as residue. This is leached with acetone to dissolve the products of fast flow pyrolysis, such as 1,2-di-polyethane and di-arylmethanes, and the esters formed by interaction with the solvent. The acetone-insoluble residue (14 g.; M.P. 275–280°) is recrystallized from hot toluene to give cyclo-di-p-xylene in the form of white cubic crystals (M.P. 281–283°).

The acetone extract is evaporated to dryness. The residue is separated by vacuum distillation at 0.14 mm. Hg pressure to give 3 fractions (1) 2.7 g. B.P. 71–87°. The infra-red spectrum (strong band at 5.75μ for

and at 12.45μ for para-substituted xylene) indicated that this fraction is a mixture of telomers of p-xylyl acetate of the type

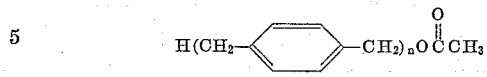

Saponification of this oil gives a mixture of para-substituted benzyl alcohols and sodium acetate. The average saponification equivalent is 164.

(2) 8.3 g.; B.P. 100–130°. Infrared analysis indicates that this is a mixture of aromatic hydrocarbons, the principal components being 1,4-di-p-tolyl-ethane and di-arylmethanes.

(3) 3.5 g. infrared analysis indicates this is a complex mixture of aromatic hydrocarbons such as cyclic tri- and di-p-xylylene. Thus, the yields of cyclo-di-p-xylylene and p-H(CH$_2$C$_6$H$_4$CH$_2$)$_n$O$_2$CCH$_3$ from p-xylylene are about 70% and 15%, respectively.

Example 5

A cold (−78°) clear solution of p-xylylene (0.4 mole) in hexane (4.5) is added to hot p-xylene (1 l.) contained in a 3 liter round bottom flask fitted with a dropping funnel stirrer and take-off condenser. The cold (−78°) p-xylylene solution is added to the hot (about 100°) xylene as fast as the hexane can be flash distilled out of the reaction mixture so that the volume of liquid in the reaction flask is about 1 liter throughout the reaction. The small amount of polymer (about 1–2 g.), formed during addition, is removed by filtration. The filtrate is evaporated to dryness and the residue (75 g.) is extracted with acetone to remove the usual non-volatile products of pyrolysis that accompany formation of p-xylylene. Cyclo-di-p-xylylene (275–281°; 0.35 mole) is left as residue. This crude cyclo-di-p-xylylene, obtained in 90% yield, is purified by re-crystallization from hot toluene to give the compound in the form of white cubic crystals M.P. 281–283°.

Example 6

A cold (−78°) solution of p-xylylene (0.3 mole) in butane (4 liters) is added over a period of 1 hour to hexane (1 liter) kept at about 20° as described previously. The small amount of insoluble polymer is removed by filtration. The solution is evaporated to dryness. The mixture of residual products is separated as described previously to give cyclo-tri-p-xylylene (M.P. 165–166°) in about 90 percent yield based on available p-xylylene. About 1% of cyclo-tetra-p-xylylene are also obtained by fractional crystallization from the mother liquors.

Example 7–11

The following examples illustrate the preparation of cyclic products within the scope of Formulas 1 through 10 above. A solution of each starting monomer is prepared by the pyrolytic technique described in Example 1 from the appropriate starting material. This solution is then diluted so as to contain about 0.05 mole of starting para-xylylene monomer per liter of solution. Then using 5 liter batches of each starting monomer solution cyclic products are formed using either one of two polymerization conditions.

In accordance with the first set of conditions (labeled "A" in Table 1 below, the filtered, cold (−78° C.) hexane solution is added dropwise to xylene maintained at 100° C., in accordance with the general procedures described in Examples 3, 4 and 5 above. The product is isolated as described previously.

In accordance with the second set of conditions (labeled "B" in Table 1 below), the filtered, cold (−78° C.) solution is warmed to 10° C. at the rate of 2° C. per liter per hour as described in Example 2. The products are isolated as described previously.

| Example No. | Starting Monomer | Polymerization Conditions | | Weight Percent [a] of Cyclic Products Isolated [b] | | |
|---|---|---|---|---|---|---|
| | | A | B | Dimers | Trimers | Other |
| 7 | CH₂=⟨F-C₆H₄⟩=CH₂ | X | | 65 | 15 | 20 |
| | | | X | 1 | 70 | 29 |
| 8 | CH₂=⟨Cl-C₆H₄⟩=CH₂ | X | | 50 | 30 | 20 |
| | | | X | 1 | 65 | 34 |
| 9 | CH₂=⟨CH₃-C₆H₄⟩=CH₂ | X | | 55 | 25 | 20 |
| | | | X | 1 | 65 | 34 |
| 10 | CH₂=⟨N-pyridyl⟩=CH₂ | X | | 60 | 15 | 25 |
| | | | X | 2 | 60 | 38 |
| 11 | CH₂=⟨naphthyl⟩=CH₂ | X | | 60 | 20 | 20 |
| | | | X | 1 | 55 | 44 |

[a] Based on weight of available monomer.
[b] Identified by infrared analysis and by molecular weight determination. Pure isomers of cyclic dimer or of cyclic trimer not isolated owing to the extremely complex number of isomer possibilities.

The claims are:

1. In a process for making cyclic dimers, trimers and tetramers of a para-xylylene, the step of adding a solid poly-para-xylylene free inert organic solvent solution of a para-xylylene maintained at a temperature not above about −45° C. to an inert hydrocarbon liquid maintained at a temperature not below about −10° C., said addition being conducted in the absence of molecular oxygen at a rate such that the para-xylylene solution is substantially instantaneously warmed to the temperature of the inert hydrocarbon.

2. In a process for making cyclic dimers, trimers and tetramers of a para-xylylene, the step of adding a solid poly-para-xylylene free inert organic solvent solution of a para-xylylene maintained at a temperature not above about −70° C. to an inert hydrocarbon liquid maintained at a temperature not below about −10° C., said addition being conducted in the absence of molecular oxygen at a rate such that the para-xylylene solution is substantially instantaneously warmed to the temperature of the inert hydrocarbon.

3. In a process for making cyclic dimers of a para-xylylene, the steps of adding a solid poly-para-xylylene free inert organic solvent solution of a para-xylylene to an inert hydrocarbon solvent, said solution of the para-xylylene being maintained at a temperature not above about −70° C., said inert hydrocarbon being maintained at a temperature not below about +70° C., said addition being conducted in the absence of molecular oxygen and at such a rate that the para-xylylene solution contacting the inert liquid hydrocarbon is substantially instantaneously warmed to about +70° C., and thereafter distilling the resulting hydrocarbon mixture so as to leave a liquid residue containing the desired cyclic dimer in at least a 0.5 molar concentration.

4. In a process for making cyclic trimers and tetramers of para-xylylene, the steps of warming a solid poly-para-xylylene free inert organic solvent solution of para-xylylene maintained at a temperature below −70° C. in the absence of molecular oxygen to a temperature ranging from about −10° C. to +10° C. at a rate of at least 2° C. per minute, the concentration of para-xylylene in the starting solution being no greater than about 0.1 molar.

5. Cyclic tetramers of a para-xylylene.

6. Cyclic tetramers of para-xylylene of the formula:

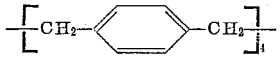

7. In the process for making cyclic trimers and tetramers of a para-xylylene, the steps of adding a solid poly-para-xylylene free inert organic solvent solution of para-xylylene maintained at a temperature not above about −70° C. in the absence of molecular oxygen to an inert liquid hydrocarbon being maintained at a temperature in the range from about −10° C. to about +10° C. at a rate and in a quantity to substantially instantaneously raise the temperature of the solution of para-xylylene to about −10° C. to about +10° C.

8. In the process for making cyclic products of a para-xylylene, the steps of warming a solid poly-para-xylylene free inert organic solvent solution of para-xylylene from a temperature below −45° C. to a cyclization temperature of at least −10° C. in the absence of molecular oxygen and maintaining the concentration of para-xylylene in solution at the cyclization temperature not greater than 0.1 molar to produce a cyclic product having a molecular weight no greater than the tetramer.

References Cited by the Examiner

UNITED STATES PATENTS 2,914,511  11/59  Errede et al. _____ 260—2
3,084,146   4/63  Errede _____ 260—2

OTHER REFERENCES

Farthing: "lin-Poly-p-xylylene," J. Chem. Soc., October 1953, page 3262.

ALPHONSO D. SULLIVAN, *Primary Examiner.*

UNITED STATES PATENT OFFICE
CERTIFICATE OF CORRECTION

Patent No. 3,198,844                              August 3, 1965

Louis A. Errede

It is hereby certified that error appears in the above numbered patent requiring correction and that the said Letters Patent should read as corrected below.

Column 2, lines 12 to 18, Formula 4 should appear as shown below instead of as in the patent:

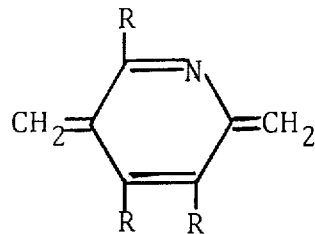

column 3, line 3, for "poly-" read -- poly para---; column 11, Example 11, the formula should appear as shown below instead of as in the patent:

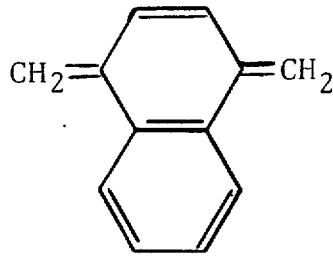

Signed and sealed this 8th day of February 1966.

(SEAL)
Attest:

ERNEST W. SWIDER                            EDWARD J. BRENNER
Attesting Officer                          Commissioner of Patents